(12) United States Patent
Peele

(10) Patent No.: US 8,978,177 B1
(45) Date of Patent: Mar. 17, 2015

(54) BED WITH INTEGRATED HIDDEN DOG RAMP

(71) Applicant: Barry Scott Peele, Beverly Hills, CA (US)

(72) Inventor: Barry Scott Peele, Beverly Hills, CA (US)

( * ) Notice: Subject to any disclaimer, the term of this patent is extended or adjusted under 35 U.S.C. 154(b) by 0 days.

(21) Appl. No.: 14/523,792

(22) Filed: Oct. 24, 2014

(51) Int. Cl.
*A47C 19/00* (2006.01)
*A47C 19/22* (2006.01)
*A47C 19/02* (2006.01)
*A01K 1/035* (2006.01)

(52) U.S. Cl.
CPC .............. *A47C 19/22* (2013.01); *A47C 19/022* (2013.01); *A47C 19/024* (2013.01); *A01K 1/035* (2013.01)
USPC .................... 5/400; 5/1; 5/2.1; 5/279.1; 5/658

(58) Field of Classification Search
CPC ........ A47C 19/22; A47C 17/52; A47C 17/86; A47C 19/02; A47C 19/022; A47C 21/00
USPC ............ 5/2.1, 1, 400, 411, 279.1, 282.1, 286, 5/308, 658, 659; 119/28.5, 847; D30/118
See application file for complete search history.

(56) References Cited

U.S. PATENT DOCUMENTS

| | | | | |
|---|---|---|---|---|
| 5,213,060 A * | 5/1993 | Sloan et al. | ................... | 119/847 |
| 5,784,995 A * | 7/1998 | Willinger | ..................... | 119/28.5 |
| 6,267,082 B1 * | 7/2001 | Naragon et al. | ............. | 119/849 |
| 6,536,372 B1 * | 3/2003 | Loeser | .......................... | 119/28.5 |
| 6,691,645 B1 * | 2/2004 | Ayers, Jr. | ...................... | 119/847 |
| 7,185,381 B1 * | 3/2007 | Heartsill et al. | ............... | 14/71.1 |
| 7,621,236 B2 * | 11/2009 | Steffey et al. | .................. | 119/847 |
| D640,015 S * | 6/2011 | Birck | ............................. | D30/118 |
| 8,117,994 B1 * | 2/2012 | Goodlow | ....................... | 119/849 |
| 8,296,882 B1 * | 10/2012 | Esposito | ........................... | 5/426 |
| 8,662,014 B1 * | 3/2014 | Harrell | ......................... | 119/28.5 |
| 2005/0115522 A1 * | 6/2005 | Bishop | ........................... | 119/847 |
| 2006/0249086 A1 * | 11/2006 | Dietz | ............................ | 119/28.5 |
| 2007/0000448 A1 * | 1/2007 | Dietz | ............................ | 119/481 |
| 2007/0006816 A1 * | 1/2007 | Dietz | ............................ | 119/482 |
| 2007/0163510 A1 * | 7/2007 | Dietz | ............................ | 119/443 |
| 2007/0289556 A1 * | 12/2007 | Hoffman et al. | .............. | 119/847 |
| 2008/0105215 A1 * | 5/2008 | Simpson et al. | .............. | 119/849 |
| 2010/0083913 A1 * | 4/2010 | Gibson | .......................... | 119/847 |
| 2011/0209672 A1 * | 9/2011 | Moore, III | ..................... | 119/847 |
| 2011/0303126 A1 * | 12/2011 | Martenson | ....................... | 108/49 |
| 2012/0246824 A1 * | 10/2012 | Friedman | ............................ | 5/95 |
| 2013/0047937 A1 * | 2/2013 | Chery | ............................ | 119/849 |
| 2013/0111663 A1 * | 5/2013 | Brown | .......................... | 5/507.1 |
| 2013/0186341 A1 * | 7/2013 | McCormack et al. | ........ | 119/28.5 |
| 2014/0123910 A1 * | 5/2014 | Rorke et al. | ................... | 119/849 |
| 2014/0238891 A1 * | 8/2014 | Tagliamonte et al. | ......... | 206/581 |

\* cited by examiner

*Primary Examiner* — Robert G Santos
*Assistant Examiner* — David E Sosnowski
(74) *Attorney, Agent, or Firm* — Plager Schack LLP

(57) ABSTRACT

Some embodiments of the present disclosure include a bed having an integrated, hidden pet ramp. The bedframe may include a headboard, a footboard, a first side rail, and a second side rail, the bedframe configured to support a mattress. A ramp support/attachment rail may extend along a length of the footboard and may support a ramp configured to support an animal. The ramp may include a ramp landing and a ramp side extending from an upward facing surface of the ramp to the floor, wherein the ramp side may abut the mattress. In embodiments, the first side rail may be shorter than the second side rail to accommodate a ramp entry, and the ramp may extend from the ramp entry upwardly to the ramp landing. Additionally, the footboard may extend upwardly past the upper surface of the ramp to hide the ramp.

9 Claims, 2 Drawing Sheets

BED WITH INTEGRATED HIDDEN DOG RAMP

BACKGROUND

The embodiments herein relate generally to furniture, and more particularly, to a bed frame with an integrated hidden dog ramp.

Many beds are too high for a small pet, such as a small dog or cat, to jump up onto. Thus, many people have resorted to using pet ramps or steps. However, conventional pet ramps and steps run beside the bed, either parallel to the bed or perpendicular to the bed in plain view. Also, conventional pet ramps and steps are unsightly, ruining the aesthetics of the room.

Therefore, what is needed is a bedframe wherein a portion of the bedframe, such as the footboard, comprises an integrated hidden pet ramp.

SUMMARY

Some embodiments of the present disclosure include a bed having an integrated, hidden pet ramp. The bedframe may include a headboard, a footboard, a first side rail, and a second side rail, the bedframe configured to support a mattress. A ramp support/attachment rail may extend along a length of the footboard and may support a ramp configured to support an animal. The ramp may include a ramp landing and a ramp side extending from an upward facing surface of the ramp to the floor, wherein the ramp side may abut the mattress. In embodiments, the first side rail may be shorter than the second side rail to accommodate a ramp entry, and the ramp may extend from the ramp entry upwardly to the ramp landing. Additionally, the footboard may extend upwardly past the upper surface of the ramp to hide the ramp.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a hidden pet ramp configured to provide a mechanism for an animal to get up on a bed and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

1. Bed
2. Ramp

The various elements of the bedframe with integrated, hidden dog ramp for providing an animal with access to the bed of the present disclosure may be related in the following exemplary fashion. It is not intended to limit the scope or nature of the relationships between the various elements and the following examples are presented as illustrative examples only.

Figure 1:
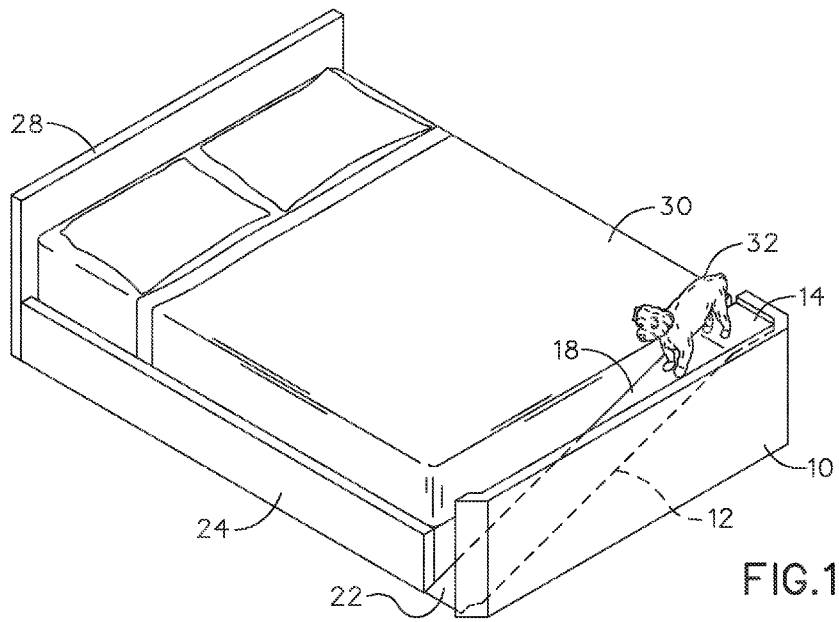
FIG. 1 is a perspective view of one embodiment of the present invention, shown in use.
Figure 2:
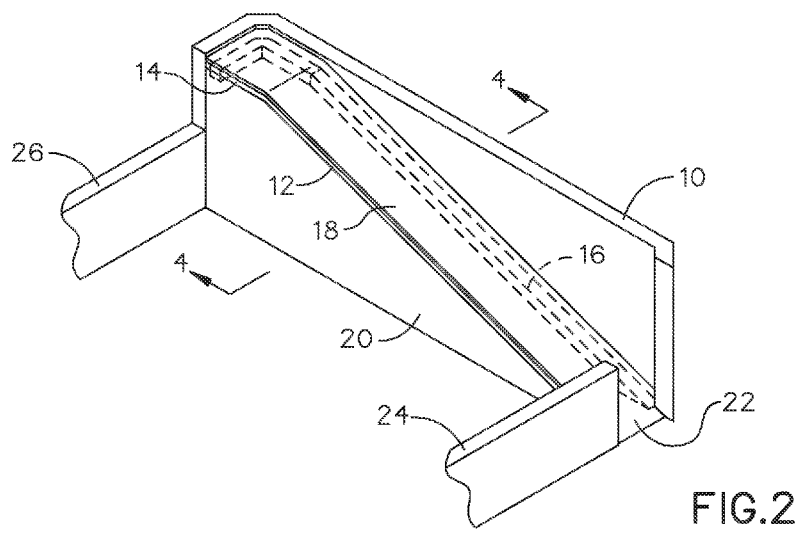
FIG. 2 is a reverse perspective view of one embodiment of the present invention.
Figure 3:
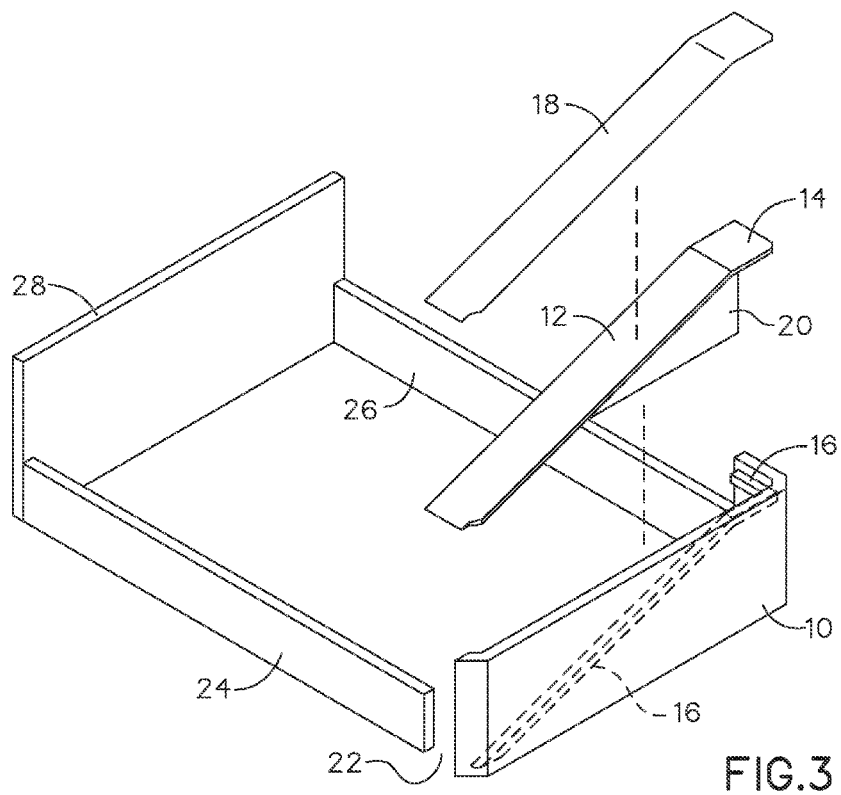
FIG. 3 is an exploded view of one embodiment of the present invention.
Figure 4:
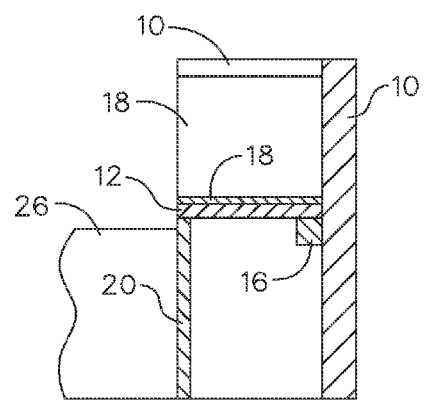
FIG. 4 is a section view of one embodiment of the present invention, taken along line 4-4 in FIG. 2.

By way of example, and referring to FIGS. 1-4, some embodiments of bedframe with integrated, hidden pet ramp of the present disclosure comprise a bedframe comprising at least one member from the group consisting of a footboard 10, a headboard 28, a first side rail 24, and a second side rail 26, wherein the at least one member has a ramp 12 attached thereto between the member and the mattress 30, wherein the ramp 12 inclines from a location proximate to the floor to a location proximate to the sleeping surface of the mattress 30. The member of the bedframe to which the ramp 12 is attached may extend upwardly past the ramp 12, such that the ramp 12 is substantially hidden from view. In some embodiments, as shown in the figures, the ramp 12 may be integrated into the footboard 10 of the bedframe, wherein a ramp entry 22 is situated proximate to the floor and proximate to the first side rail 24 of the bedframe. In such an embodiment, the first side rail 24 may be shorter than the second side rail 26 to accommodate the ramp entry 22.

In embodiments, the ramp 12 may be attached to or integrated with the bedframe member, such as the footboard 10, using any suitable means. In embodiments, the bedframe member may comprise a ramp support/attachment rail 16 attached thereto, the ramp support/attachment rail 16 configured to support the ramp 12. Additionally, the ramp 12 may also comprise a ramp side 20 configured to extend from an upper surface of the ramp 12 to the floor, wherein the ramp side 20 may abut the mattress 20. The ramp 12 may also comprise a ramp landing 14 proximate to an upper most surface of the ramp 12 and aligned substantially parallel to the ground. Moreover, the ramp 12 may comprise a ramp covering 18 attached to an upward facing surface of the ramp 12, wherein the upward facing surface is the surface on which an animal may walk.

The ramp 12 may have any suitable dimensions. In some embodiments, the ramp 12 may have a width of about 1 foot. Thus, in some embodiments, the second side rail 26, which does not comprise the ramp entry 22, may be about 1 foot longer than the first side rail 24. As shown in the figures, the ramp 12 may comprise a smooth surface that extends upward from the ramp entry 22 to the ramp landing 14. However, in other embodiments, the ramp 12 may comprise a set of stairs rather than a smooth ramp.

The ramp covering 18 may comprise any suitable material and, in some embodiments, comprises a material configured to prevent the animal from sliding down the ramp. Thus, the ramp covering 18 may provide an animal with some traction. In some embodiments, the ramp covering 18 may comprise a carpet material, which ideally may compliment the style and color of the bed as a whole.

To use the bed with the integrated ramp 12 of the present invention, a user would use the bed as normal and an animal, such as a dog or cat, may be able to get up to the mattress 30 using the ramp rather than having to jump onto the bed or having to be picked up and placed on the bed, wherein the ramp 12 is not in plain view in the room.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A bed having an integrated and hidden pet ramp, the bed comprising:
   a bedframe comprising a headboard, a footboard, a first side rail, and a second side rail;
   a ramp attached to the at least one member, wherein the ramp is positioned between a surface of the at least one member and a mattress that is configured to be supported by the bedframe, the ramp is attached to the footboard and is located inboard of the footboard between the footboard and a foot end of the mattress, with a ramp entry being positioned proximate to the first side rail; and
   the first side rail is shorter than the second side rail to accommodate the ramp entry,
   wherein the ramp extends from a first position proximate to a floor to a second position proximate to a sleeping surface of the mattress.

2. The bed of claim 1, wherein the at least one member having a ramp attached thereto is a footboard.

3. The bed of claim 2, wherein the footboard extends upwardly past a top surface of the ramp.

4. The bed of claim 1, wherein the ramp comprises a ramp landing proximate to an uppermost surface of the ramp and aligned substantially parallel to the floor.

5. The bed of claim 1, further comprising a ramp covering attached to an upward facing surface of the ramp, wherein the upward facing surface is configured to accommodate an animal walking thereon.

6. The bed of claim 1, wherein:
   a ramp support/attachment rail is attached to the at least one member that is attached to the ramp, and the ramp is mounted to the ramp support/attachment rail; and
   the ramp further comprises a ramp side extending from an upward facing surface of the ramp to the floor, wherein the ramp side is configured to abut the mattress.

7. A bed having an integrated, hidden pet ramp, the bed comprising:
   a bedframe comprising a headboard, a footboard, a first side rail, and a second side rail, the bedframe configured to support a mattress;
   a ramp support/attachment rail extending along a length of the footboard;
   a ramp supported by the ramp support/attachment rail, the ramp comprising;
      a ramp landing proximate to an upper most surface of the ramp and aligned substantially parallel to a floor; and
      a ramp side extending from an upward facing surface of the ramp to the floor, wherein the ramp side is configured to abut the mattress
   wherein:
      the first side rail is shorter than the second side rail to accommodate a ramp entry;
      the ramp extends from the ramp entry upwardly to the ramp landing;
      the footboard extends upwardly past an upper surface of the ramp; and
      the ramp is configured to support an animal.

8. The bed of claim 7, further comprising a ramp covering attached to the upward facing surface of the ramp, the ramp covering comprising a material configured to prevent an animal from slipping down the ramp.

9. The bed of claim 8, wherein the ramp comprises a set of stairs extending from the ramp entry to the ramp landing.

\* \* \* \* \*